(12) United States Patent
Han et al.

(10) Patent No.: US 7,804,954 B2
(45) Date of Patent: Sep. 28, 2010

(54) INFRASTRUCTURE FOR ENABLING HIGH QUALITY REAL-TIME AUDIO

(75) Inventors: Mu Han, Redmond, WA (US); Warren Vincent Barkley, Mill Creek, WA (US); Wei Zhong, Issaquah, WA (US); Gurdeep S. Pall, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 487 days.

(21) Appl. No.: 11/281,071

(22) Filed: Nov. 17, 2005

(65) Prior Publication Data

US 2007/0116186 A1     May 24, 2007

(51) Int. Cl.
    *H04M 1/00* (2006.01)
(52) U.S. Cl. .................. 379/399.02; 370/236; 370/256; 370/352; 379/9.06; 704/E19.005; 704/500
(58) Field of Classification Search ............... 379/93.17, 379/102.02, 236, 399.02, 352, 102, 9.06; 370/236, 256, 352
See application file for complete search history.

(56) References Cited

U.S. PATENT DOCUMENTS

| | | | |
|---|---|---|---|
| 6,704,304 B1 | 3/2004 | Gallagher et al. | |
| 6,813,264 B2 | 11/2004 | Vassilovski | |
| 6,826,174 B1 | 11/2004 | Erekson et al. | |
| 6,868,080 B1 | 3/2005 | Umansky et al. | |
| 6,947,385 B2* | 9/2005 | Havens | 370/236 |
| 7,003,093 B2* | 2/2006 | Prabhu et al. | 379/390.02 |
| 7,221,663 B2* | 5/2007 | Rodman et al. | 370/329 |
| 2002/0122417 A1 | 9/2002 | Miller et al. | |
| 2002/0176403 A1 | 11/2002 | Radian | |
| 2002/0186683 A1* | 12/2002 | Buck et al. | 370/352 |
| 2003/0091024 A1 | 5/2003 | Stumer | |
| 2003/0131132 A1 | 7/2003 | Cheng et al. | |
| 2004/0002864 A1 | 1/2004 | Yeom | |
| 2004/0252691 A1* | 12/2004 | Hori et al. | 370/390 |
| 2005/0052996 A1 | 3/2005 | Houck et al. | |
| 2006/0171378 A1* | 8/2006 | Harris et al. | 370/352 |
| 2006/0256721 A1* | 11/2006 | Yarlagadda et al. | 370/235 |
| 2007/0091907 A1* | 4/2007 | Seshadri et al. | 370/401 |

OTHER PUBLICATIONS

International Search Report dated Mar. 23, 2007 for Application No. PCT/US2006/042503, 8 pages.
AsteriskOUT, available at http://www.asteriskout.com/, accessed Oct. 19, 2005.
Ditech Communications Corporation, "Voice Quality Assurance™ for VoIP-PSTN Gateways", available at http://www.ditechcom.com/solutions/solutionsdetail.aspx?pid=47, accessed Oct. 20, 2005.
Cisco Systems, "Vonage: Vonage Uses Cisco Solutions to Quickly Deploy Unique, Cost-Effective VoIP Services", available at http://www.cisco.com/warp/public/cc/techno/tyvdve/sip/prodlit/vcpag_cp.pdf, Dated 2002.

(Continued)

*Primary Examiner*—Melur Ramakrishnaiah
*Assistant Examiner*—Yosef K Laekemariam

(57) ABSTRACT

Various technologies and techniques are disclosed that improve media communications. In one embodiment, a media server receives a media communication with a first quality from a personal computer with VoIP telephone capabilities. The media server translates the media (e.g., audio, visual, etc.) communication into a second quality, and forwards the media communication to a communication gateway. The translation to improve communications can also be done when receiving the media communication from the communication gateway for forwarding to the personal computer having VoIP telephone capability. In some embodiments, a media server sits in the communication channel between a personal computer with VoIP telephone capabilities and a communication gateway and is able to translate communications into codec protocols they each understand.

20 Claims, 8 Drawing Sheets

OTHER PUBLICATIONS

PMC-Sierra, Inc., "VoIP Network Processor Chip Family", available at http://www.pmc-sierra.com/voip-network-processor/, accessed Oct. 19, 2005.

Office Action from the Patent Office of the State Intellectual Property Office of the People's Republic of China for Application No. 200680043166.5 dated Sep. 4, 2009.

* cited by examiner

INFRASTRUCTURE FOR ENABLING HIGH QUALITY REAL-TIME AUDIO

BACKGROUND

Communications networks have evolved from circuit-switched networks such as the Public Switched Telephone Network (PSTN) to packet-switched networks such as the Internet. Packet-switched networks are designed for packet-based communications, such as Voice over Internet Protocol (VoIP). Most networks existing today are either packet-based or circuit-switched. Packet-based and circuit-switched networks have many differences, such as bandwidth availability, that often require the use of different coder/decoder (codec) schemes for voice and multimedia (e.g., video, etc.) communications.

VoIP infrastructures that do not allow users to cell traditional telephone endpoints are of limited value. The bridge between these two worlds is generally done with a network element, such as a VoIP/PSTN gateway. These VoIP/PSTN gateways are used in the telecommunications industry to pass messages and data between different networks. VoIP/PSTN gateways typically only support a limited set of codecs, which means that some communications based on codecs that the gateway does not support will not go through. In addition, these gateways often provide poor quality audio communications caused by the dynamic and sometimes unstable nature of packet-based communications. As a further problem, most of the VoIP services on the market do not encrypt the voice data because the gateways typically cannot encrypt them. In such scenarios, because the gateways are on the public Internet and because the voice data is unencrypted, these communications are insecure and can be intercepted by other people on the Internet. These scenarios result in a poor quality voice experience and/or an insecure voice experience for the users, if the user is even able to complete the communication at all.

SUMMARY

Described herein are various embodiments of inventive technologies and techniques that will improve communications, such as audio or video communications. As one non-limiting example, a media server implementing one or more of the techniques herein improves the quality of the communications that it facilitates between a personal computer with VoIP telephone capabilities and a communications gateway. The media server receives an audio communication with a lower quality from a personal computer with VoIP telephone capabilities. The media server translates the audio communication into a higher quality, and forwards the audio communication to a communication gateway. The translation to improve quality can also be done when receiving the audio communication from the communication gateway for forwarding to the VoIP telephone on the personal computer.

As another non-limiting example, a media server implementing one or more of the techniques herein is able to facilitate communications between a personal computer with VoIP telephone capabilities and a communications gateway, where the two would otherwise be incapable of communicating with each other because of incompatible codec protocols. In such a scenario, the media server sits in the middle of the communication chain and translates communications between the personal computer with VoIP telephone capabilities and the communication gateway into codec protocols they each understand.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
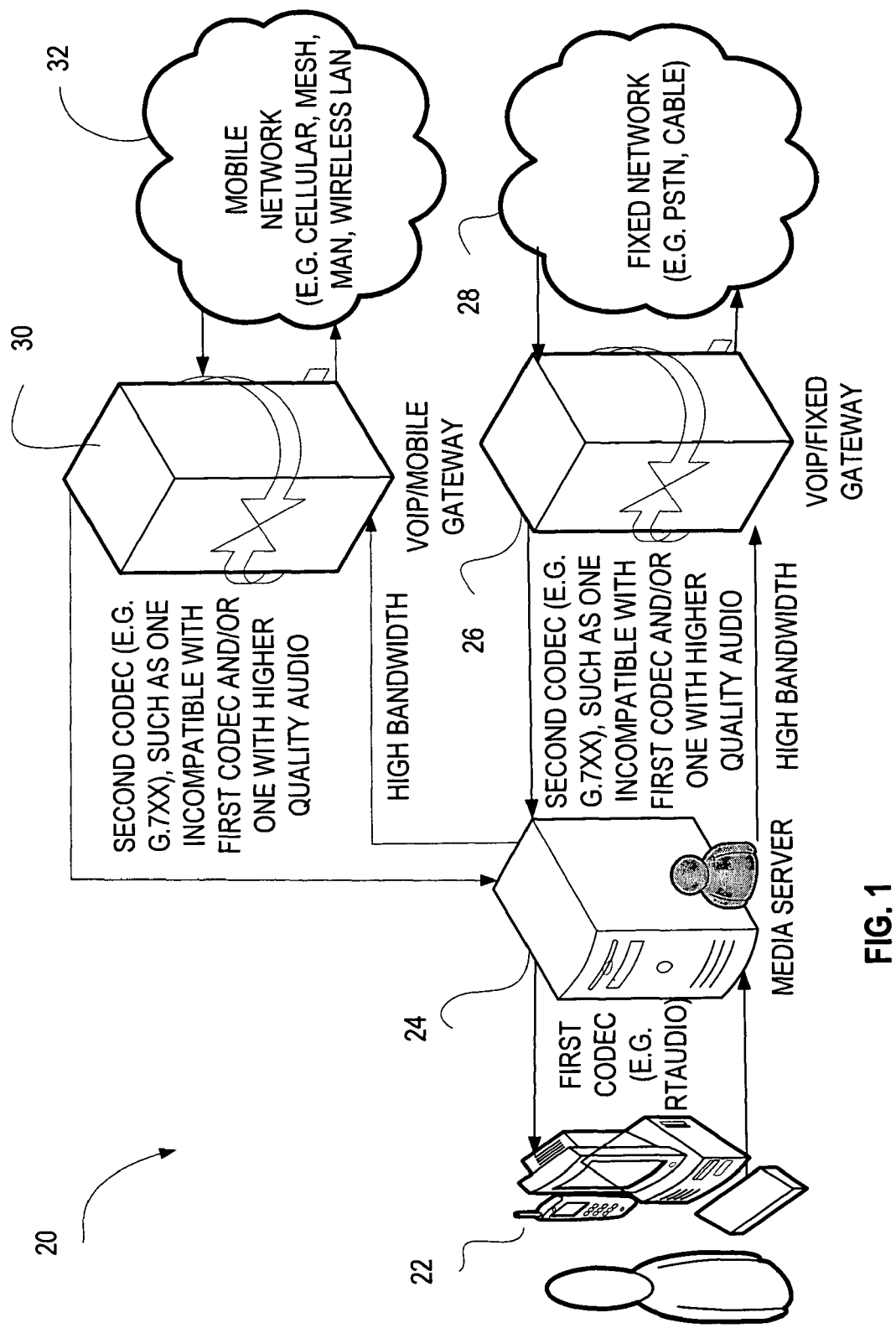
FIG. 1 is a diagrammatic view of parts of a communication system.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art. Throughout this discussion, communications are primarily described as "VoIP" or "audio" communications for convenience but persons of ordinary skill in the art understand that the inventions herein may apply to other media types, such as visual media.

In one embodiment, the system may be described in the general context as an application that improves audio and/or visual (e.g., multimedia, video, etc.) communications, but the system also serves other purposes in addition to these. As shown in FIG. 1, communication system 20 has a media server 24 that facilitates audio communications between a VoIP telephone on personal computer 22 and one or more of gateways 26 and 30. In various embodiments, the VoIP telephone may be a software application running on computer 22 or a stand-alone hardware device connected with computer 22 by, e.g., Bluetooth, LAN, Universal Serial Bus (USB) or similar connection technologies. Gateway 30 passes communications to and from a mobile network 32, such as a cellular network, mesh network, wireless metropolitan-area-network (MAN), and/or wireless local-area-network (LAN). In the embodiment shown, Gateway 26 passes communications between Fixed Network 28 and computer 22. These communications can pass over the Internet or other packet-switched networks at various points between the depicted network elements. In one implementation, media server 24 improves the communications between VoIP phone on personal computer 22 and gateways 26 and/or 30 by translating the codecs from a first protocol that is not understood by the other into a second protocol that is understood by the other, and/or by translating/modifying the audio data into a higher quality.

In another implementation, high bandwidth (e.g. high speed) Internet connections are present between media server 24 and one or more of gateways 26 and 30. In an alternative embodiment, the media server 24 and mobile gateways 26 and 30 are co-located on a private network, such as a corporate LAN, WAN, etc. A high bandwidth Internet connection improves the quality of the communication by helping eliminate loss and jitter problems that would be present with low speed connections to a gateway. In some embodiments, new features desired in a VoIP scenario can be implemented on media server 24, so gateways 26 and 30 can continue to serve their dedicated purpose without modification. In some instances, by implementing these new features on the media server 24 instead of on gateways 26 and/or 30, the features can be added faster, less expensively, and while allowing the existing dedicated gateways to operate without modification or interruption of service.

Figure 2:
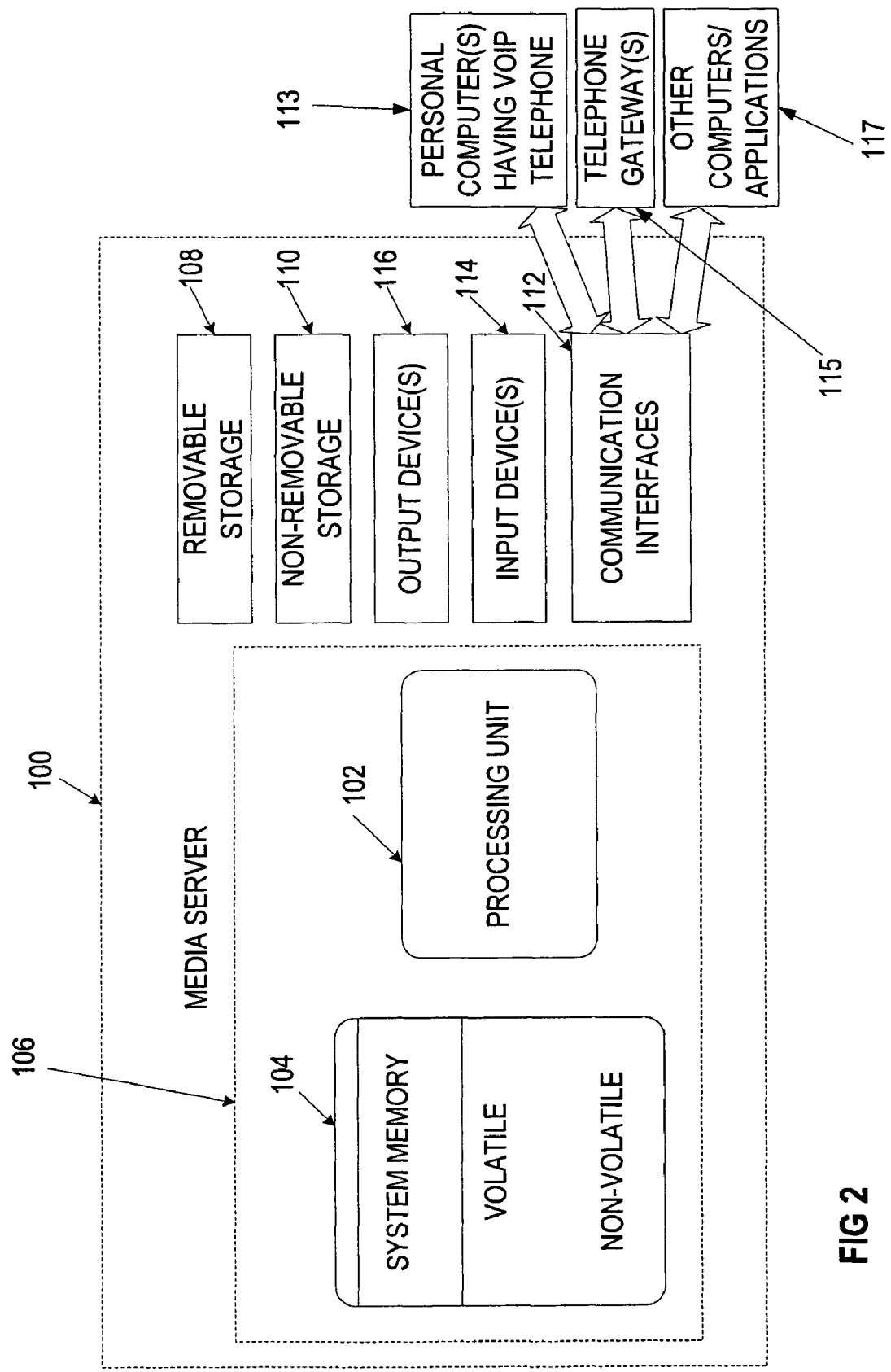
FIG. 2 is a diagrammatic view of a computer system of one implementation of the system of FIG. 1.

As shown in FIG. 2, an exemplary computer system to use for implementing one or more parts of the system 20 includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 2 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 2 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 contains one or more communications interface (s) 112 that allow the device to communicate with other devices. For example, communications interface(s) 112 allows computing device 100 to communicate with one or more personal computers having a VoIP telephone 113, one or more telephone gateways 115, and computers/applications 117, where applicable. Examples of communications interfaces are serial ports, Universal Serial Bus (USB) ports, parallel ports, wireless communication adapters, network adapters, etc. Communications interface (s) 112 are used by computer 100 to exchange information such as communication media with external devices. Some examples of communication media are computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 100 may also have input device(s) 114 such as keyboard, mouse, pen, voice input device, touch input device, etc. Output device(s) 116 such as a display, speakers, printer, etc. may also be included. These devices are well known in the art and need not be discussed at length here.

Figure 3:
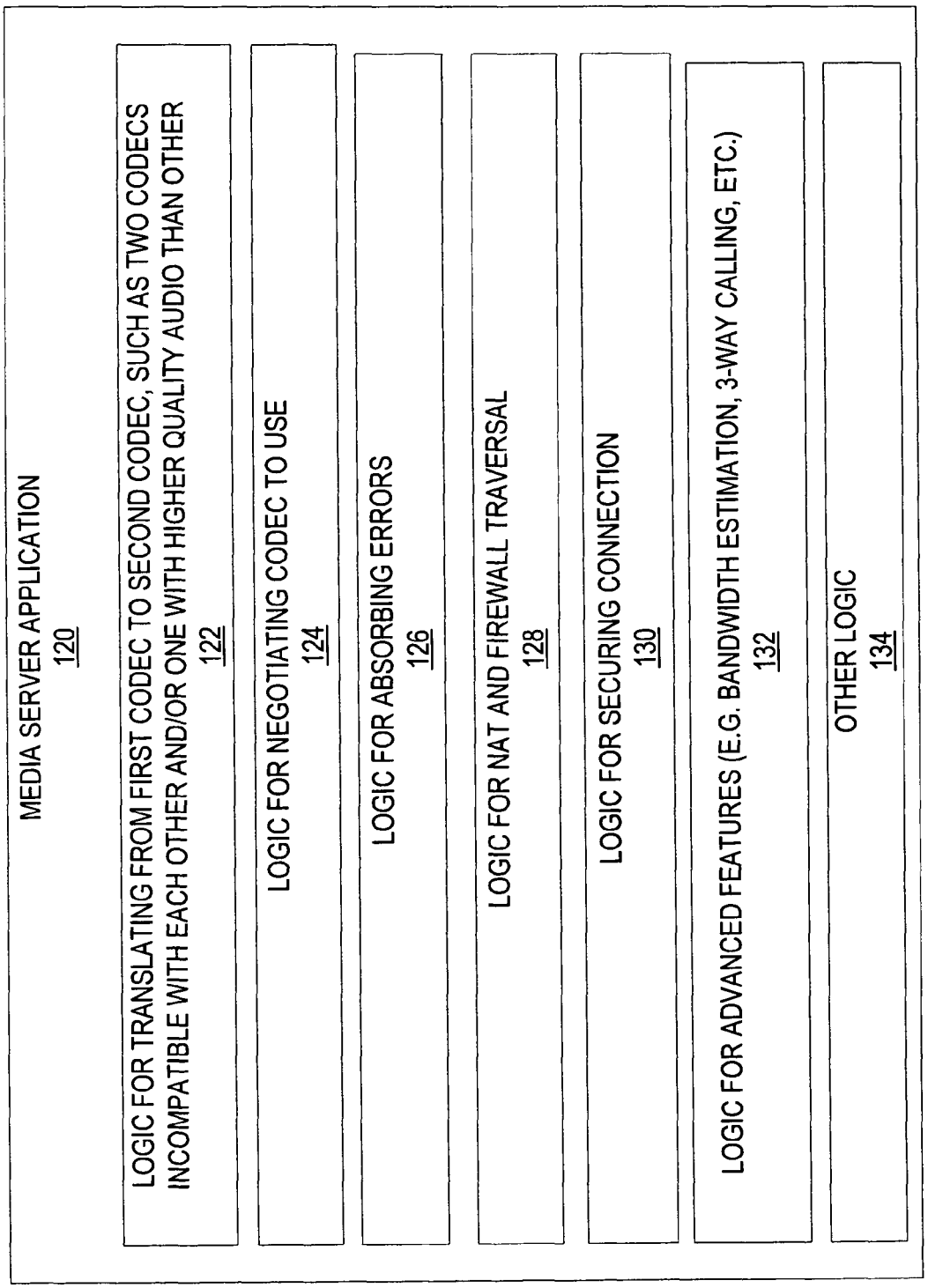
FIG. 3 is a diagrammatic view of a media server application operating on the computer system of FIG. 2.

Turning now to FIG. 3 with continued reference to FIG. 2, a media server application 120 operating on computing device 100 is illustrated. Media server application 120 is one of the application programs that reside on computing device 100. Alternatively or additionally, one or more parts of media server application 120 can be part of system memory 104, on other computers and/or applications 117, or other such variations as would occur to one in the computer software art.

Media server application 120 includes business logic, which is responsible for carrying out some or all of the techniques described herein. In the embodiment shown, business logic may include logic for translating a communication from a first codec into a second codec 122, such as two codecs incompatible with each other and/or one with a higher quality audio or video than the other; Logic 124 is responsible for negotiating a codec to use for a particular communication; Logic 126 is responsible for absorbing errors that are present in the communication; Logic 128 is responsible for Network Address Translation (NAT) and/or firewall traversal to allow communications to go through that would otherwise be blocked; Logic 130 is responsible for securing the communications, such as using secure Real-time Transport Protocol (RTP); Logic 132 is responsible for advanced features, such as three-way calling, bandwidth estimation, and so on; Other logic 134 is responsible for other logic which operates the media server application 120.

In FIG. 3, business logic of media server 120 is shown to reside on computing device 100. However, it will be understood that business logic of media server 120 can alternatively or additionally be embodied as computer-executable instructions on one or more computers and/or in different variations than shown on FIG. 3. As one non-limiting example, one or more parts of business logic of media server 120 could alternatively or additionally be implemented as a web service that resides on an external computer that is called when needed.

Figure 4:
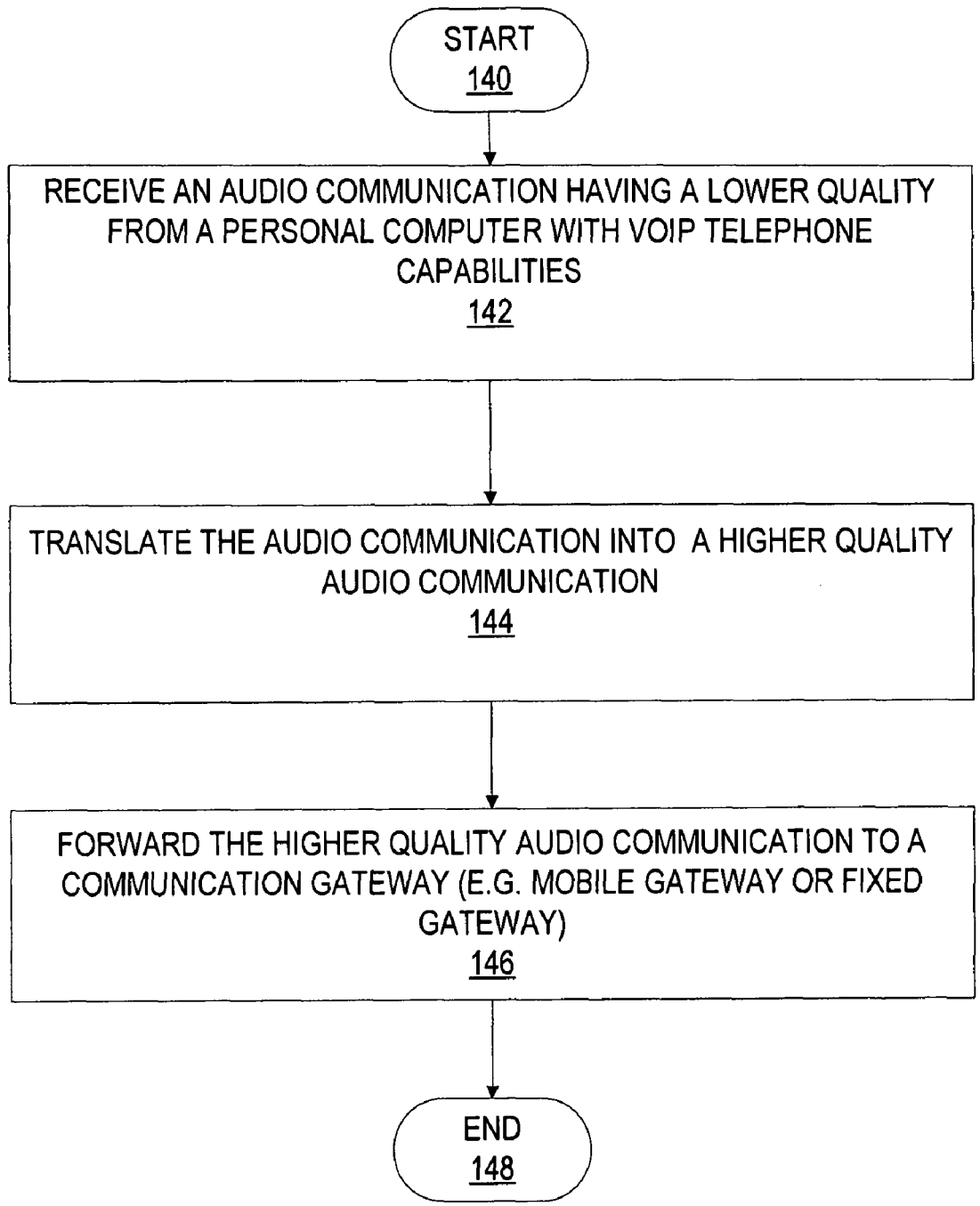
FIG. 4 is a high-level process flow diagram for one implementation of the system of FIGS. 1 and 2.

Turning now to FIGS. 4-8 with continued reference to FIGS. 1-3, the stages for implementing one or more implementations of media server application 120 are described in further detail. FIG. 4 is a high level process flow diagram for one embodiment of a media server application 120. The process begins at start point 140 with receiving an audio communication having a lower quality from a personal computer with VoIP telephone capabilities (stage 142). The system translates the telephone call into a higher quality audio communication (stage 144). The system forwards the higher quality telephone call to a communication gateway (stage 146). The process then ends at end point 148.

Figure 5:
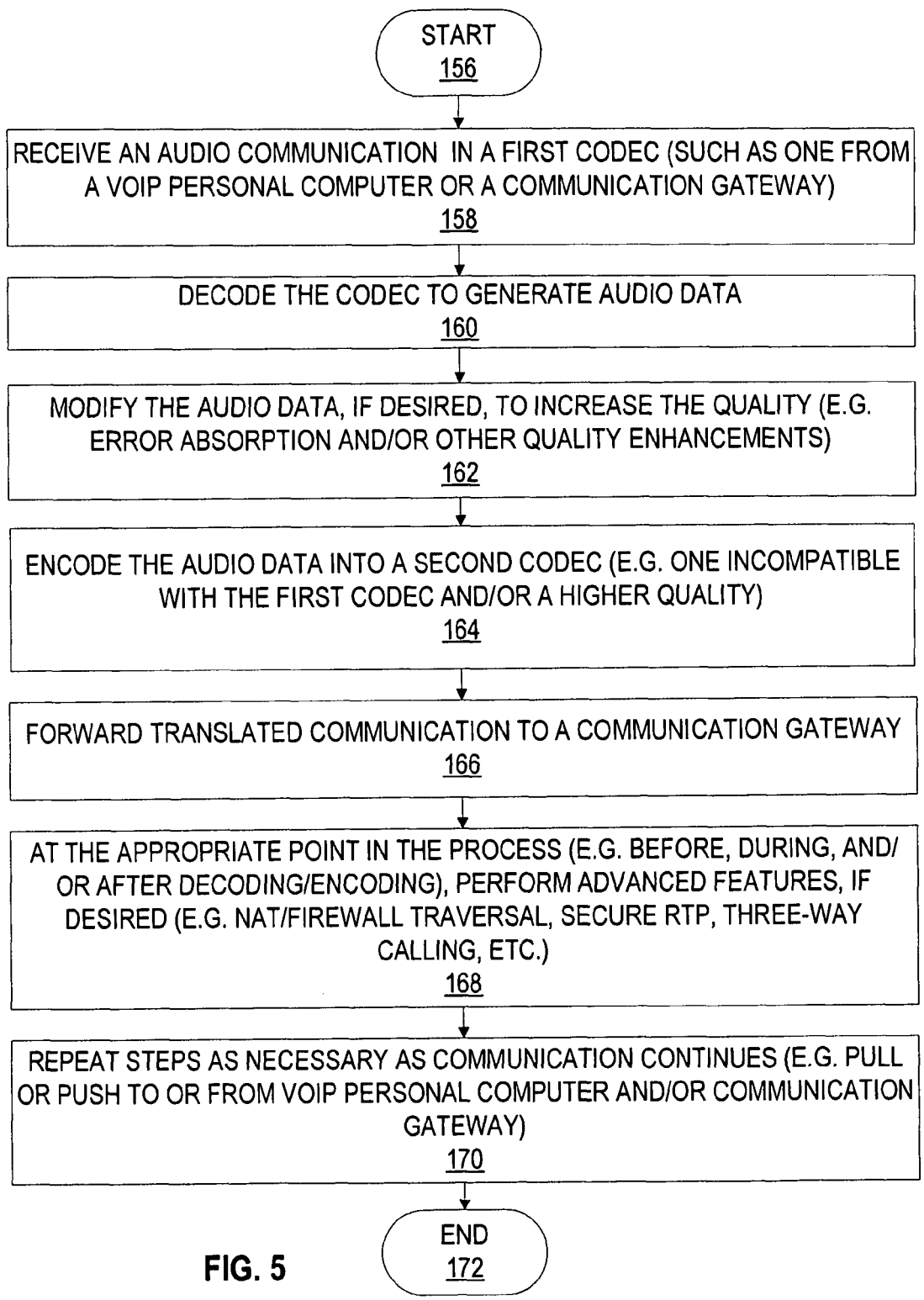
FIG. 5 is a process flow diagram for one implementation of the system of FIGS. 1 and 2 illustrating the stages involved in translating an audio communication into a format having a higher quality.

FIG. 5 illustrates one embodiment of the stages involved in translating an audio communication into a format having a higher quality. In one form, the process of FIG. 5 is at least partially implemented in the operating logic of communications device 100. The process begins at start point 156 with the system receiving an audio communication in a first codec (such as one from a VoIP-enabled personal computer or a communication gateway) (stage 158). The system decodes the codec to generate audio data (stage 160). The system modifies the audio data, if desired, to increase the quality, such as using error absorption and/or other quality enhancements (stage 162).

The system encodes the audio data into a second codec (e.g. one incompatible with the first codec and/or of a higher quality) (stage 164). In one implementation, the first and second codecs are different codecs, and the audio data in the second codec is of better quality than the first codec because of modifications made to the data to increase the quality. In other words, the second codec can actually be of an equal or lower quality than the first codec standing alone, but with the modifications made to the data, it becomes a higher quality. In another implementation, the second codec itself is of a higher quality than the first codec standing alone. In yet another implementation, the first and second codecs are actually based on the same codec protocol, where additional modifications are made to the audio data to enhance the quality and where the audio data is then re-encoded back into the same codec. Other variations are also possible to enhance the quality of the media communication. The system forwards the translated communication to a communication gateway (stage 166).

At the appropriate point in this process, the system performs advanced features, if desired (stage 168). For example, these advanced features can be performed before, during, and/or after the decoding and/or encoding stages described. As one non-limiting example, the system is operable to perform NAT/firewall traversal if the communication would otherwise be blocked by a firewall. As another non-limiting example of advanced features, in one implementation, the system is operable to secure the communication channel, such as using secure RTP. As another non-limiting example, the system is operable to join three or more parties into the communication, with at least one of the parties using a VoIP telephone. The system repeats the steps as necessary as communication continues (stage 170), such as to pull or push the communication from a VoIP personal computer and/or the communication gateway. The process then ends at end point 172.

Figure 6:
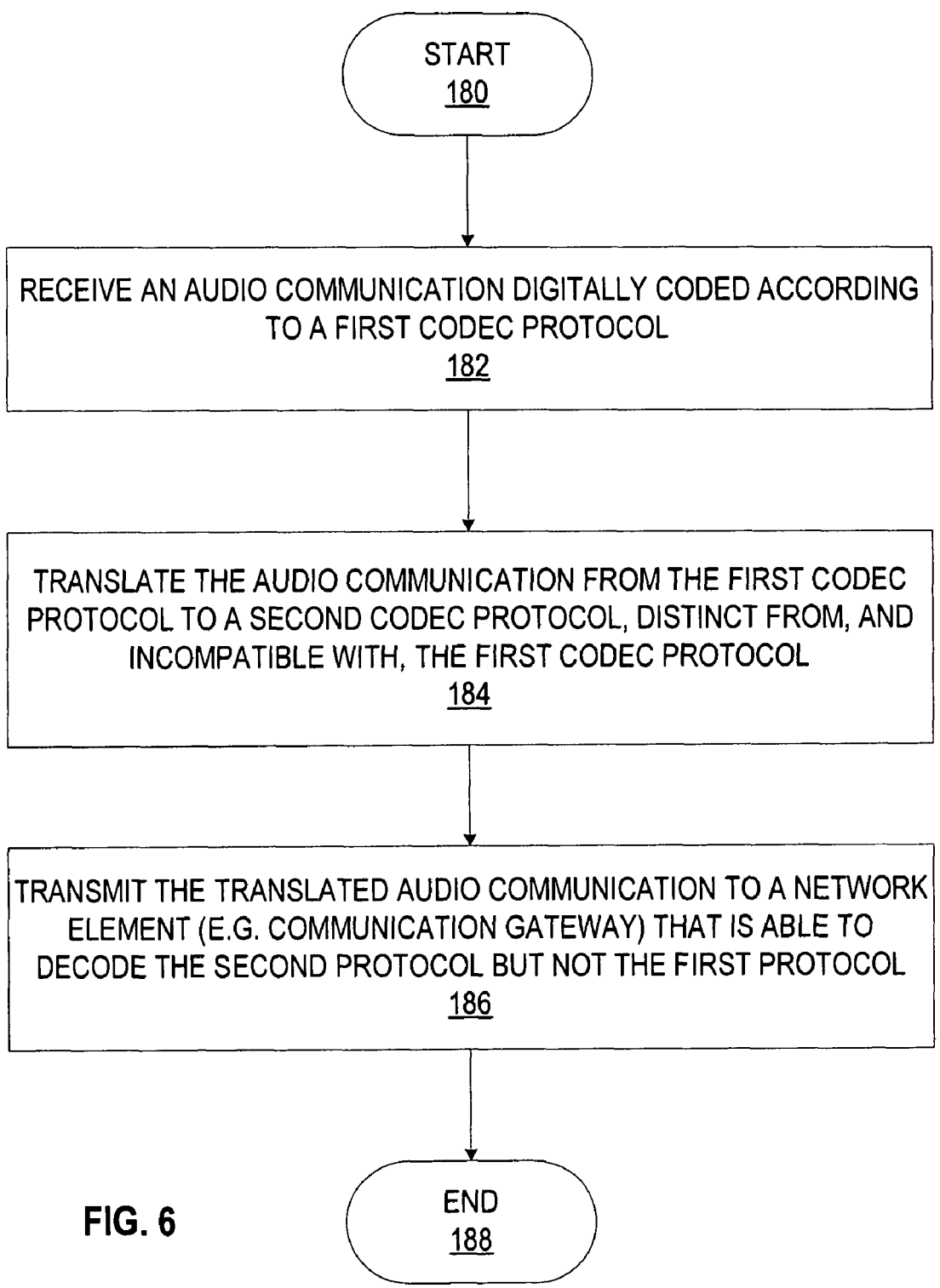
FIG. 6 is a process flow diagram for one implementation of the system of FIGS. 1 and 2 illustrating the stages involved in translating an audio communication from a first codec into a second codec that is incompatible with the first codec.

FIG. 6 illustrates the stages involved in one embodiment of translating an audio communication from a first codec into a second codec that is incompatible with the first codec. In one form, the process of FIG. 6 is at least partially implemented in the operating logic of computing device 100. The process begins at start point 180 with the system receiving an audio communication digitally coded according to a first codec protocol (stage 182). The system translates the audio communication from the first codec protocol to a second protocol, distinct from, and incompatible with, the first codec protocol (stage 184). As one non-limiting example, the system can translate the audio communication from an RTAudio codec protocol that a particular gateway does not understand into a codec protocol that the gateway understands. For example, a typical gateway may use one of the family of audio G.7XX codecs, such as G.711. Various other translation scenarios are possible. The system transmits the translated audio communication to a network element (e.g. telephone gateway) that is able to decode the second protocol but not the first protocol (stage 186). The process then ends at end point 188.

Figure 7:
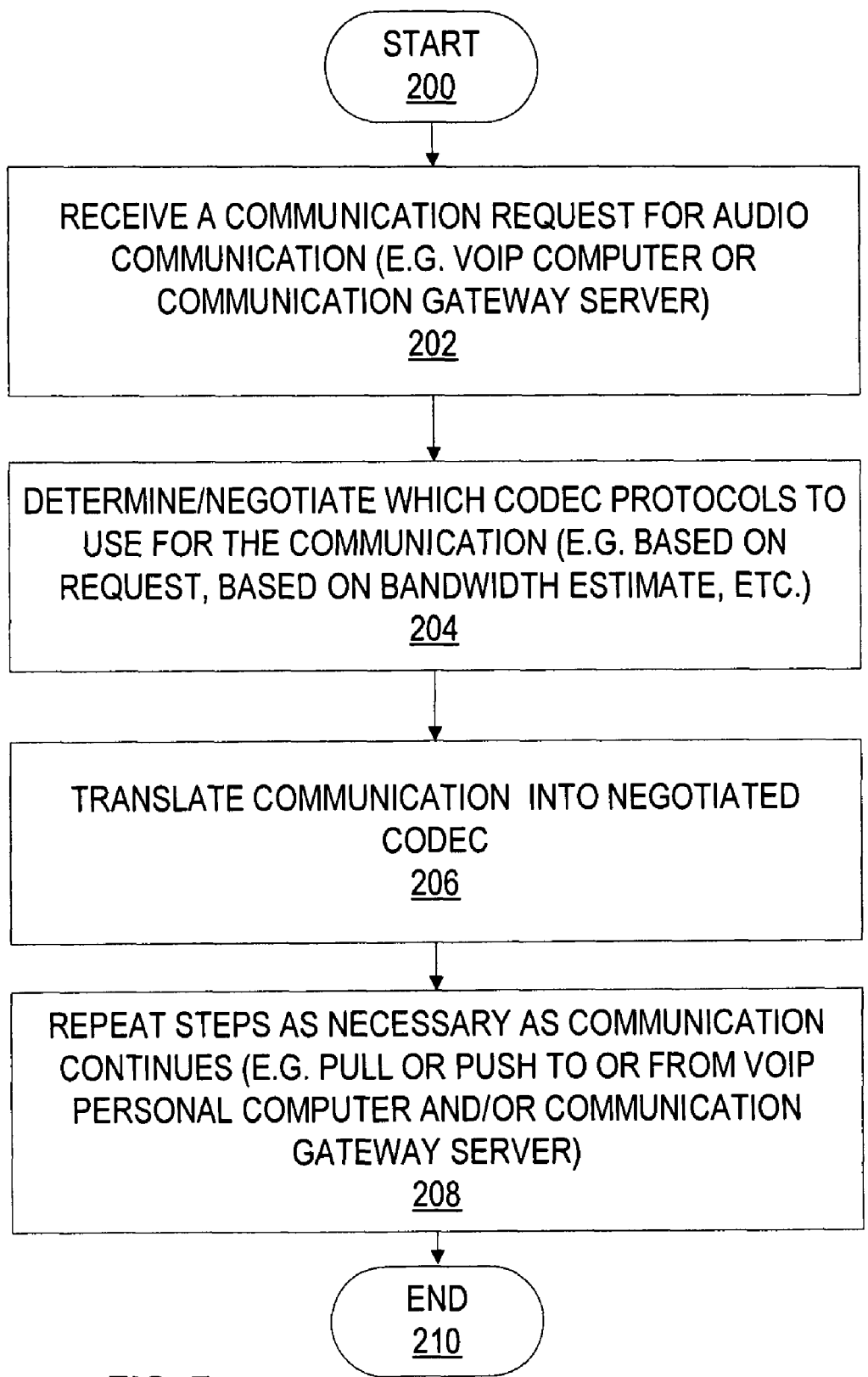
FIG. 7 is a process flow diagram for one implementation of the system of FIGS. 1 and 2 illustrating the stages involved in negotiating a codec protocol to use for a communication.

FIG. 7 illustrates the stages involved in one embodiment of negotiating a codec protocol to use for a communication. In one form, the process of FIG. 7 is at least partially implemented in the operating logic of computing device 100. The process begins at start point 200 with the system receiving a communication request for an audio communication (e.g. from a VoIP computer or communication gateway server) (stage 202). The system negotiates which codec protocol(s) to use for the communication (stage 204). As one non-limiting example, the computer (22, 26, or 30) communicating with the media server 24 can exchange information with the media server 24 so it can determine which codec protocol is required, which one is requested, and/or which other codec is also supported. As another non-limiting example, media server 24 can use an estimation of available bandwidth to determine which codec would be best suited to handle the communication. The system translates the communication into the negotiated codec (stage 206). The system repeats the steps as necessary as communication continues (stage 208). The process then ends at end point 210.

Figure 8:
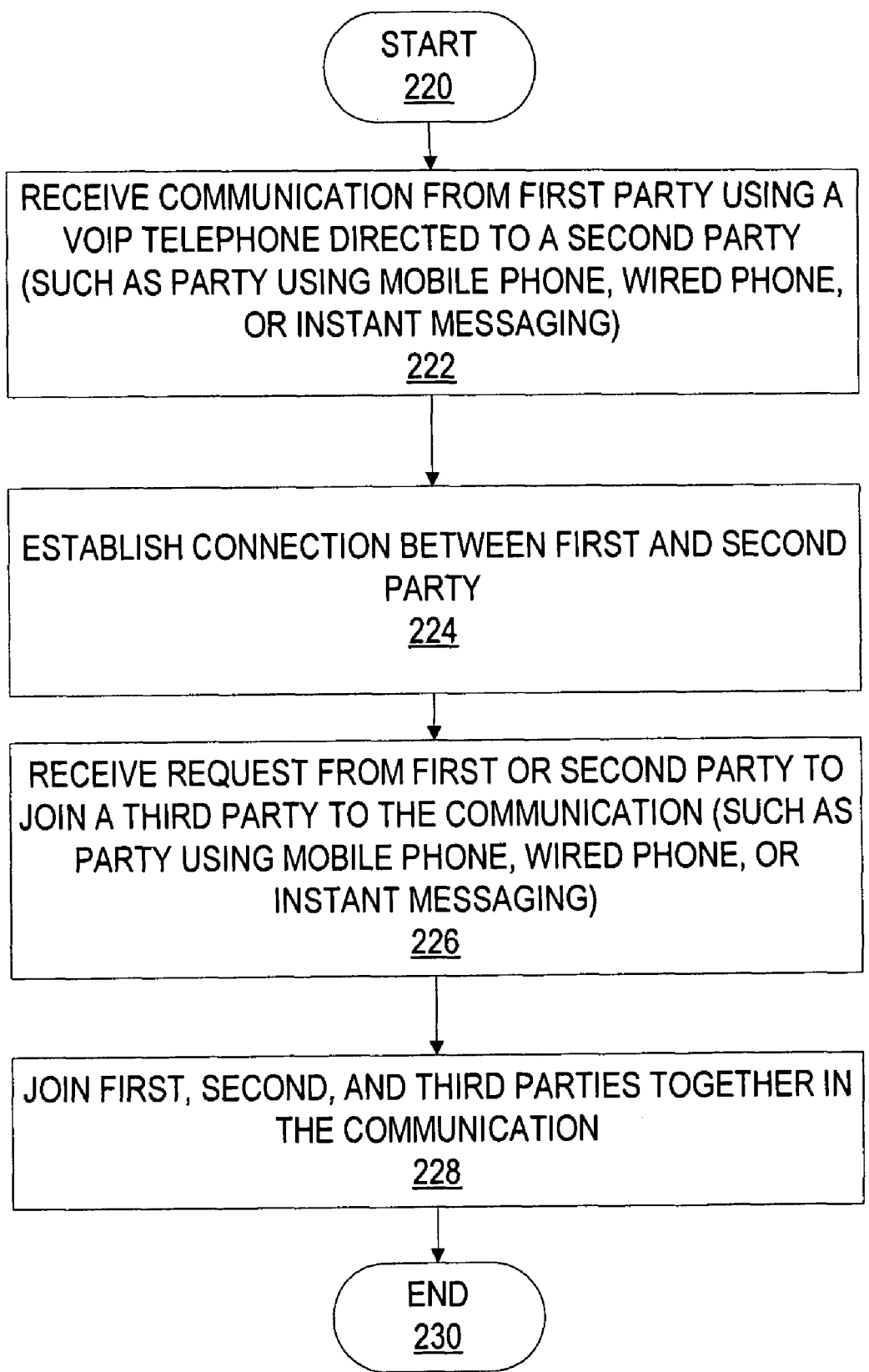
FIG. 8 is a process flow diagram for one implementation of the system of FIGS. 1 and 2 illustrating the stages involved in processing communications between three or more parties, where at least one party is using a VoIP telephone.

FIG. 8 illustrates the stages involved in one embodiment of processing communications between three or more parties where at least one party is using a VoIP telephone. In one form, the process of FIG. 8 is at least partially implemented in the operating logic of computing device 100. The process begins at start point 220 with the system receiving a communication request from the first party using a VoIP telephone directed to a second party (such as a party using a mobile phone, wired phone, or instant messaging) (stage 222). The system establishes the connection between the first party and the second party (stage 224). The system receives the request from the first party or second party to join a third party to the communication (such as the party using a mobile phone, wired phone, or instant messaging) (stage 226). The system joins the first, second and third parties together in the communication (stage 228). The process then ends at end point 230.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A communications system, comprising:
   a media server configured to be inserted into a communication path between at least one personal computer having VoIP capability and at least one communication gateway;
   wherein the media server is configured to improve quality of audio data received in media communications from the personal computer having VoIP capability and quality of media communications received by the communication gateway; and
   wherein the media server is to:
      receive a first media communication comprising encoded audio data from the personal computer having VoIP capability,
      decode the encoded audio data of the first media communication with a first audio codec that was used by the personal computer to generate the encoded audio data, determine a limited group of audio codecs supported by the communication gateway based on a codec protocol requested by the communication gateway, select a second audio codec that is different from the first audio codec from the limited group of audio codecs supported by the communication gateway when the limited group of audio codecs supported by the communication gateway does not include the first audio codec that was used by the personal computer to generate the encoded audio data, translate the audio data that has been decoded at the media server into higher quality audio data when the second audio codec that was selected from the limited group of audio codecs supported by the communication gateway is of equal or lower quality than the first audio codec that was used by the personal computer to generate the encoded audio data, encode the higher quality audio data with the second audio codec, and forward the encoded higher quality audio data to the communication gateway in a second media communication having a higher quality than the first communication.

2. The system of claim 1, wherein the first audio codec is an RTAudio codec.

3. The system of claim 1, wherein the group of audio codecs based on the determined codec protocol includes one or more G.7XX codecs.

4. The system of claim 1, wherein the communication gateway is one of a fixed communication gateway and a mobile communication gateway.

5. The system of claim 4, wherein the communication gateway is a mobile communication gateway for at least one of a cellular network, a mesh network, a wireless metropolitan area network, and a wireless local area network.

6. The system of claim 4, wherein the communication gateway is a fixed communication gateway for at least one of a public switched telephone network and a cable network.

7. The system of claim 1, wherein the media server is to exchange information with the communication gateway to determine which particular audio codec from the group of audio codecs to use as the second audio codec.

8. The system of claim 1, wherein the audio data decoded at the media server is translated into higher quality audio data using error absorption.

9. The system of claim 1, wherein the media communication is at least one of an audible communication, a visual communication, and a multimedia communication.

10. The system of claim 1, wherein the media server is to facilitate a three-way communication between devices used by a first person, a second person, and a third person, and wherein the first person participates in the three-way communication using the personal computer having VoIP capability.

11. The system of claim 10, wherein the media server is to allow the second person to participate in the three-way communication using at least one of a wired telephone and a wireless telephone.

12. The system of claim 10, wherein the media server is to allow participation in the three-way communication using instant messaging.

13. The system of claim 1, wherein the media server is to traverse a firewall in a secure fashion to allow the second media communication to go through securely.

14. The system of claim 1, wherein the first audio codec and the second audio codec are incompatible.

15. A computer-readable storage medium having computer-executable instructions for causing a computer to perform steps comprising:

decoding encoded audio data included in a first audio communication received from a personal computer having VoIP communication capabilities with a first audio codec that was used by the personal computer to generate the encoded audio data;

selecting a second audio codec that is different from the first audio codec from a limited group of audio codecs supported by a telephone gateway when the limited group of audio codecs supported by the telephone gateway does not include the first audio codec that was used by the personal computer to generate the audio data;

translating audio data that has been decoded into higher quality audio data when the second audio codec selected from the limited group of audio codecs supported by the telephone gateway is of equal or lower quality than the first audio codec that was used by the personal computer to generate the encoded audio data;

encoding the higher quality audio data with the second audio codec;

forwarding the encoded higher quality audio data to the telephone gateway in a second audio communication having a higher quality than the first audio communication; and if the second audio communication would be unable to reach an intended destination because of a firewall block, providing a feature to traverse the firewall in a secure fashion.

16. The computer-readable storage medium of claim 15, further comprising computer-executable instructions for:

providing a feature to enable three-way communication between devices of three parties, with at least one of the three parties using the personal computer having VoIP communication capabilities.

17. The computer-readable storage medium of claim 15, wherein quality parameters are adjusted and one or more errors present in the first audio communication are absorbed during the translating of decoded audio data into higher quality audio data.

18. A method comprising the steps of:

receiving, at a media server, a first media communication comprising encoded audio data from a personal computer having VoIP telephone capabilities;

decoding, at the media server, the encoded audio data of the first media communication with a first audio codec that was used by the personal computer to generate the encoded audio data;

determining a limited group of audio codecs supported by a communication gateway based on a codec protocol requested by the communication gateway;

selecting a second audio codec that is different from the first audio codec from the limited group of audio codecs supported by the communication gateway when the limited group of audio codecs supported by the communication gateway does not include the first audio codec that was used by the personal computer to generate the encoded audio data;

adjusting the audio data that has been decoded at the media server to generate higher quality audio data when the second audio codec that was selected from the limited group of audio codecs is of equal or lower quality than the first audio codec that was used by the personal computer to generate the encoded audio data;

encoding the higher quality audio data with the second audio codec; and forwarding, from the media server to the communication gateway, the encoded higher quality audio data in a second media communication having a higher quality than the first media communication.

19. The method of claim 18, wherein the adjusting further comprises correcting for jitter.

20. The method of claim 18, further comprising:

estimating available bandwidth for communications with the communication gateway, and determining which codec of the limited group of audio codecs supported by the communication gateway would best suit the available bandwidth.

* * * * *